United States Patent [19]

Kochanowski et al.

[11] Patent Number: 4,460,731

[45] Date of Patent: Jul. 17, 1984

[54] REINFORCED THERMOPLASTIC POLYESTER COMPOSITIONS

[75] Inventors: John E. Kochanowski, Stockbridge, Mass.; Allen D. Wambach, Evansville, Ind.

[73] Assignee: General Electric Company, Pittsfield, Mass.

[21] Appl. No.: 541,273

[22] Filed: Oct. 12, 1983

Related U.S. Application Data

[63] Continuation of Ser. No. 383,623, Jun. 1, 1982, abandoned, which is a continuation of Ser. No. 179,823, Aug. 20, 1980, abandoned, which is a continuation of Ser. No. 755,353, Dec. 29, 1976, abandoned.

[51] Int. Cl.$^3$ .................................................. C08K 3/40
[52] U.S. Cl. .................................... 524/451; 524/539; 524/494
[58] Field of Search ............................. 524/451, 539

[56] References Cited

U.S. PATENT DOCUMENTS

| | | | |
|---|---|---|---|
| 3,859,246 | 1/1975 | Jackson et al. | 524/451 |
| 3,953,394 | 4/1976 | Fox et al. | 524/513 |
| 3,963,669 | 6/1976 | Wurmb et al. | 524/492 |
| 4,113,692 | 9/1978 | Wambach | 524/537 |
| 4,122,061 | 10/1978 | Holub et al. | 524/513 |

*Primary Examiner*—Lewis T. Jacobs
*Attorney, Agent, or Firm*—Hedman, Gibson, Costigan & Hoare

[57] ABSTRACT

Reinforced thermoplastic molding compositions are provided comprising a high molecular weight linear polyester, such as poly(1,4-butylene terephthalate) and another high molecular weight polyester, such as poly(ethylene terephthalate), in combination with talc and one or more reinforcing agents or fillers.

2 Claims, No Drawings

REINFORCED THERMOPLASTIC POLYESTER COMPOSITIONS

CROSS REFERENCE TO RELATED APPLICATIONS

This application is a continuation of application Ser. No. 383,623, filed June 1, 1982, now abondoned, which was a continuation of application Ser. No. 179,823, filed Aug. 20, 1980, now abondoned, which was in turn a continuation of application, Ser. No. 755,353, filed Dec. 29, 1976, also abondoned.

This invention relates to reinforced thermoplastic molding compositions having improved properties. More particularly it relates to compositions comprised of two linear polyesters, a particulate filler with a low aspect ratio, e.g., talc, and a reinforcing amount of one or more reinforcing agents or fillers, e.g., glass.

BACKGROUND OF THE INVENTION

High molecular weight linear polyesters and copolymers of glycols and terephthalic or isophthalic acid are well known materials. These are described, for example, in Winfield et al., U.S. Pat. No. 2,465,319 and Pengilly, U.S. Pat. No. 3,047,539, the disclosures of which are incorporated herein by reference. These patents disclose that the polyesters are particularly advantageous as film and fiber-formers.

With the development of molecular weight control, use of nucleating agents and two-step molding cycles, poly(ethylene terephthalate) has become an important constituent of injection moldable compositions. Poly(1,4-butylene terephthalate), because of its very rapid crystallization from the melt, is uniquely useful as a component in such compositions. Workpieces molded from such polyester resins, in comparison with other thermoplastics, offer a high degree of surface hardness and abrasion resistance, high gloss, and lower surface friction.

A useful family of such thermoplastic compositions comprises those which are reinforced, e.g., with a reinforcing agent such as talc, mica, clay, or, preferably, filamentous glass.

Poly(1,4-butylene terephthalate) resins are well known and have been widely employed for the production of thermoplastic molded articles. Reinforced compositions of poly(1,4-butylene terephthalate) have been commercially available for a number of years, and these compositions are useful for a plurality of applications, especially when a high degree of solvent resistance is required.

When glass reinforced poly(1,4-butylene tereptha-late) is molded into various articles, it has a tendency to become distorted or warped, especially when the molded article has a thin section. It is disclosed in co-pending, commonly assigned U.S. patent application Ser. No. 662,910 filed Mar. 1, 1976, the disclosure of which is incorporated herein by reference, that if a polycarbonate resin is added to the reinforced poly(1,4-butylene terephthalate) molding composition, the molded articles are substantially resistant to warpage or distortion after they are removed from the mold.

It has now been found that the addition of talc to a reinforced composition comprised of poly(1,4-butylene terephthalate) and poly(ethylene terephthalate) provides significant warp reduction. Moreover, substitution of part of the poly(1,4-butylene terephthalate) with poly(ethylene terephthalate) in such compositions enhances the resistance to warping to an unexpected degree.

It is therefore an object of this invention to provide novel reinforced polyester molding compositions having improved warp reduction.

DETAILED DESCRIPTION OF THE INVENTION

The present invention generally provides novel reinforced thermoplastic molding compositions which comprise:
(a) two high molecular weight linear polyesters;
(b) talc or another particulate filler having a low aspect ratio; and
(c) a reinforcing amount of a reinforcing agent.

The present invention specifically provides novel thermoplastic molding compositions comprised as follows:
(a) from 99 to 1 parts by weight of poly(1,4-butylene terephthalate);
(b) from 1 to 99 parts by weight of poly(ethylene terephthalate);
(c) a small, effective warp-reducing amount of a particulate filler having a low aspect ratio; and
(d) a reinforcing amount of a reinforcing agent.

Illustratively, the high molecular weight polyesters, i.e., poly(1,4-butylene terephthalate) and poly(ethylene terephthalate), will have an intrinsic viscosity of at least about 0.4 dl/g and, preferably, at least 0.8 dl/g as measured in a 60:40 phenol/tetrachloroethane mixture at 30° C. The poly(1,4-butylene terephthalate) employed should preferably have an intrinsic viscosity between about 0.4 and 1.2 dl/g as measured at 30° C. in a 60/40 solution of phenol/tetrachloroethane. A more preferred range is between about 0.6 and 0.9 dl/g.

The compositions of this invention will be comprised of a particulate filler having a low aspect ration. Any particulate filler having a low aspect ratio is useful herein. Talc is a preferred particulate filler. The particulate filler should be present in a small, effective amount.

The talc employed in the present invention is used in a finely divided form and the particle size may vary widely as, for instance, from about 0.01 to 1,000 microns, with the preferred particle size being less than about 50 microns. The particle may also assume any naturally existing or desired shape as, for instance, acicular, fibrous, flat platelet, etc.

As reinforcing agents, there may be employed reinforcing amounts of reinforcing filler. In general, any filler can be used, e.g., aluminum, iron, or nickel, and the like, and non-metals, e.g., clay, coke, carbon filaments, silicates, such as acicular calcium silicate, magnesium silicate, asbestos, titanium dioxide, potassium titanate and titanate whiskers, glass flakes, and filamentous glass, and mixtures thereof. It is to be understood that, unless the filler adds to the strength and stiffness of the composition, it is only a filler and not a reinforcing filler as contemplated herein. In particular, the reinforcing fillers tend to increase flexural strength, flexural modules, tensile strength, and heat-distortion temperature.

Although it is only necessary to use a reinforcing amount of the reinforcing agent, in general from 1 to 80 parts by weight of the total weight of the composition may comprise the reinforcing agent. A preferred range is from 5 to 50 parts by weight.

The preferred reinforcing fillers are of glass, and it is especially preferred to use filamentous glass comprised of lime-aluminum borosilicate glass that is relatively soda free. This in known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastics reinforcement are made by mechanical pulling. The filament diameters range from about 0.000112 0.00075 inch, but this is not critical to the present invention.

Best properties will usually be obtained if the sized filamentous glass reinforcement comprises from about 1 to about 80 parts by weight based on the combined weight of the total composition, and preferably the glass will comprise from about 10 to about 40 parts by weight. Generally, for direct molding use, up to about 60 parts by weight of glass can be present without causing flow problems. However, it is useful also to prepare the compositions containing substantially greater quantities, e.g., up to about 70 to 80 parts by weight of glass. These concentrates can then be custom blended with blends of resins that are not glass reinforced to provide any desired glass content of a lower value.

The length of the glass filaments and whether or not they are bundled into fibers and the fibers bundled in turn to yarns, ropes or rovings, or woven into mats, and the like, are also not critical to the invention. However, in preparing the present compositions it is convenient to use the filamentous glass in the form of chopped strands of from about ⅛" to about 1" long, preferably less than ¼" long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.000005" and 0.125".

Because it has been found that certain commonly used flammable sizings on the glass, e.g., dextrinized starch or synthetic polymers, contribute flammability often in greater proportion than expected from the amount present, it is preferred to use lightly sized or unsized glass reinforcements in those compositions of the present invention which are flameretardant. Sizings, if present, can readily be removed by heat cleaning or other techniques well known to those skilled in the art.

The compositions of this invention can contain any of the well-known plasticizers. It is preferred to employ as a plasticizer a fatty acid ester, such as butyl acetyl ricinoleate. The plasticizer may be present in an amount of from about 0.01 to 5 parts by weight of the total composition, preferably in an amount of from 0.05 to 2 parts by weight.

The compositions of the invention will preferably be comprised of from about 90 to 40 parts be weight of poly(1,4-butylene terephthalate) plus poly(ethylene terephthalate) and from about 10 to 60 parts by weight of filler plus reinforcing agent. Preferably the ratio to the amount of poly(butylene terephthalate) to the amount of poly(ethylene terephthalate) will be greater than or equal to one.

The compositions of the present invention also may include flame-retardant agents that render the compositions flame-retardant. Usuable flame-retardants are disclosed in U.S. Pat. Nos. 3,833,685, 3,334,154, and 3,671,487 which are hereby incorporated by reference. Other flame-retardants are disclosed in U.S. Pat. Nos. 3,681,281, 3,577,053, 3,830,771, and U.K. Pat. No. 1,358,080, all of which are incorporated by reference.

In general, the flame-retardant additives useful in this invention comprise a family of chemical compounds well known to those skilled in the art. Generally speaking, the more important of these compounds contain chemical elements employed for their ability to impart flame-resistance, e.g., bromine, chlorine, antimony, phosphorus and nitrogen. It is preferred that the flame-retardant additive comprise a halogenated organic compound (brominated or chlorinated); a halogen-containing organic compound in admixture with antimony oxide; elemental phosphorus or a phosphorus compound; a halogen- containing compound in admixture with a phosphorus compound or compounds containing phosphorus-nitrogen or a mixture of two or more of the foregoing.

The amount of flame-retardant additive used is not critical to the invention, so long as it is present in a minor proportion based on said composition—major proportions will detract from physical properties—but at least sufficient to render the polyester resin composition non-burning or self-extinguishing. Those skilled in the art are well aware that the amont will vary with the nature of the resing and with the efficiency of the additive. In general, however, the amount of additive will be from 0.5 to 50 parts by weight per hundred parts of polyester or mixture of polyesters. A preferred range will be from about 3 to 25 parts and an especially preferred range will be from about 8 to 12 parts of additive per 100 parts of the polyester composition. Smaller amounts of compounds highly concentrated in the elements responsible for flame-retardance will be sufficient, e.g., elemental red phosphorus will be preferred at 0.5 to 2.0 parts by weight per hundred parts of the polyester composition, while phosphorus in the form of triphenyl phosphate will be used at 25 parts of phosphate per 100 parts of the polyester composition, and so forth. Halogenated aromatics will be used at 8 to 12 parts and synergists, e.g., antimony oxide will be used at about 2 to 5 parts by weight per 100 parts of the polyester composition.

The composition of this invention may be prepared by any standard procedure. The compositions may be made, e.g., by tumbling the components in a suitable mixing apparatus, extruding the mixed powders into a continuous strand, chopping the strands into pellets, and thereafter molding the pellets into the desired shape. These preparation techniques are well known to those skilled in the art and do not form a part of this invention.

DESCRIPTION OF THE PREFERRED EMBODIMENTS

The following example illustrates certain compositions according to the invention. It is merely illustrative and is not to be construed to limit the claims in any manner whatsoever.

EXAMPLE 1

The following formulations are mechanically blended and co-extruded in an extruder at 500° F. The extruded and chopped compositions are molded into test pieces in an injection molding machine at 480° F. (cylinder) and 130° F. (mold). Compositions and physical test data are set forth as follows (for comparison purposes, one experiment is carried out without adding talc to the respective composition):

| Example | 1 | 1A* |
|---|---|---|
| Composition (parts by weight) | | |
| poly(1,4-butylene terephthalate) I.V. 0.90 | 45 | 42 |
| poly(ethylene terephthalate) I.V. 0.62 | 25 | 28 |
| ⅛" glass fiber reinforcement | 10 | 30 |
| talc | 20 | — |
| Ferro 904 (stabilizer) | 0.05 | 0.05 |
| Mold Release | 0.10 | — |
| Properties | | |
| Izod impact (ft. lbs./in. notch) | 0.7 | 1.5 |
| Tensile strength (psi) | 11,200 | 16,500 |
| Flexural modulus (psi) | 760,000 | 1,100,000 |
| Heat-distortion temperature (°F.), 264 psi | 398 390 | 380 |
| Warpage (mm.) after heat treatment for ½ hr. at 350° F. | 10 | 35 |

*Control experiment - typical properties.

It is seen that the presence of poly(1,4-butylene terephthalate) and poly(ethylene terephthalate) with a small amount of a particulate filler having a low aspect ratio, namely, talc, and glass, leads to a marked reduction in the warpage of heat treated parts from these compositions.

Obviously, in the light of the above-detailed examples, many variations are possible. For example, instead of talc, another particulate filler having a low aspect ratio can be used. Instead of glass fibers as mineral filler, noracite, aluminas, silicas, glass beads, coke, and the like, can be used.

It is, therefore, to be understood that changes may be made in the particular embodiments of the invention described which are within the full intended scope of the invention as defined by the appended claims.

We claim:

1. A reinforced thermoplastic composition which provides molded articles with enhanced resistance to warpage, said composition consisting essentially of:
 (a) from about 40 to 90 parts by weight of poly(1,4-butylene terephthalate) and poly(ethylene terephthalate), the ratio of poly(1,4-butylene terephthalate) to poly(ethylene terephthalate) to poly(ethylene terphthalate) being equal to or greater than 1; and
 (b) from about 10 to 60 parts by weight of a combination of:
  (i) an effective, warp reducing amount of talc, plus
  (ii) a reinforcing amount of filamentous glass.

2. A reinforced thermoplastic composition which provides molded articles with enhanced resistance to warpage, said composition consisting essentially of:
 (a) from about 40 to 70 parts by weight of poly(1,4-butylene terephthalate) and poly(ethylene terephthalate), the ratio of poly(1,4-butylene terephthalate) to poly(ethylene terephthalate) being equal to or greater than 1; and
 (b) about 20 parts by weight of talc plus about 10 parts by weight of filamentous glass.

* * * * *

UNITED STATES PATENT AND TRADEMARK OFFICE
CERTIFICATE OF CORRECTION

PATENT NO. : 4,460,731
DATED : July 17, 1984
INVENTOR(S) : John E. Kochanowski, Allen D. Wambach It is certified that error appears in the above—identified patent and that said Letters Patent is hereby corrected as shown below:

In Claim 1, Column 6, line 14-15, delete "to poly(ethylene terphthalate)".

Signed and Sealed this

Twelfth Day of February 1985

[SEAL]

Attest:

DONALD J. QUIGG

Attesting Officer     Acting Commissioner of Patents and Trademarks